2,016,349

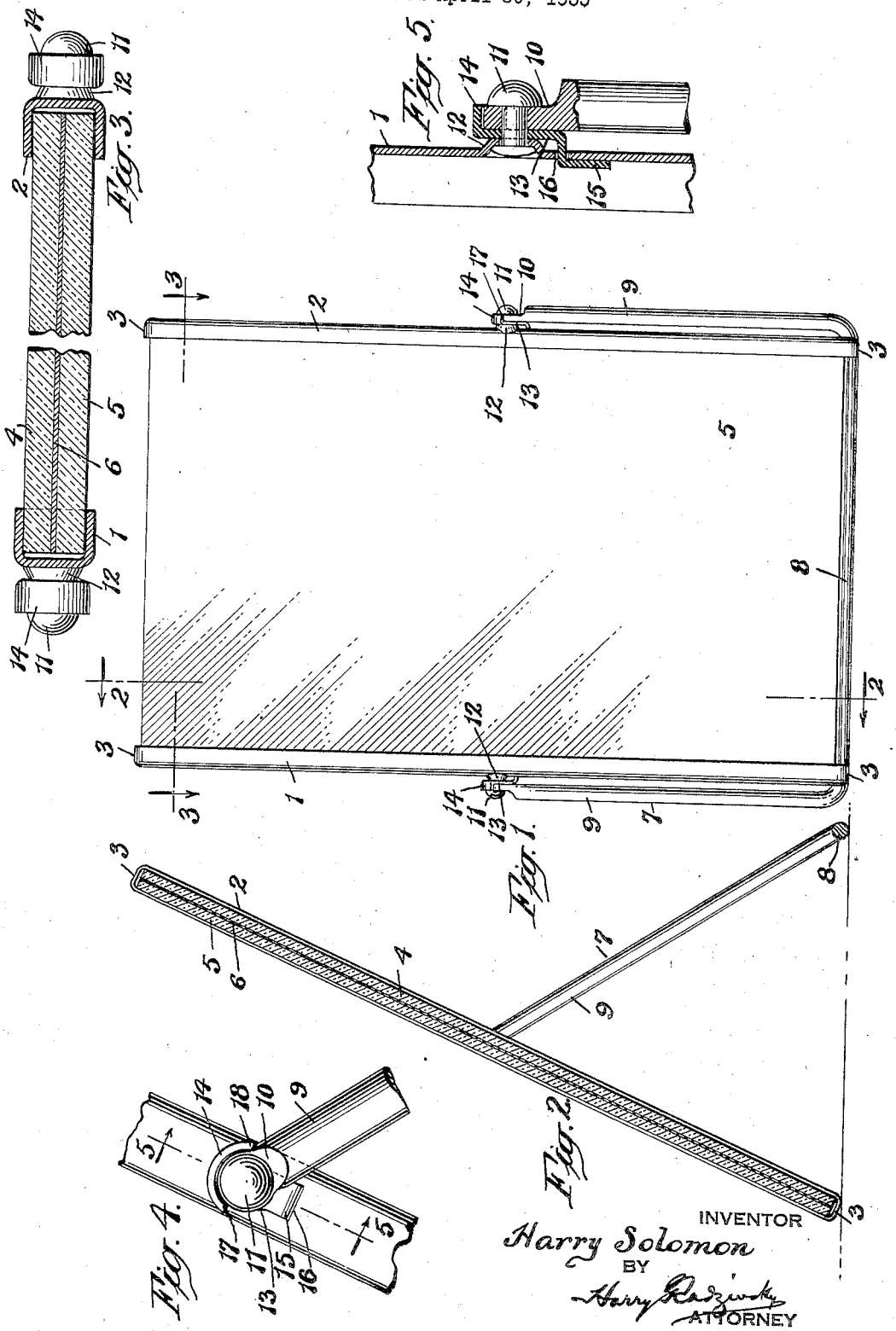
Oct. 8, 1935.    H. SOLOMON    2,016,349
PICTURE AND MIRROR FRAME
Filed April 30, 1935
INVENTOR
Harry Solomon
BY
Harry Radzinsky
ATTORNEY Patented Oct. 8, 1935

UNITED STATES PATENT OFFICE 2,016,349

PICTURE AND MIRROR FRAME

Harry Solomon, New York, N. Y.

Application April 30, 1935, Serial No. 19,060

3 Claims. (Cl. 40—152.1)

This invention relates to frames for pictures, mirrors and the like, and has for its object the provision of a frame which will neatly, securely and removably hold two pictures, or a mirror and a picture or two mirrors.

More particularly the invention comprises an easel consisting of a substantially U-shaped piece of spring material having a pair of arms springing toward one another for a limited distance to clamp one or more pictures, mirrors or the like between channel shaped holding members or sockets pivotally attached to the ends of said arms. The invention also contemplates the provision of stop means for restricting the pivotal movement of the easel with respect to the channelled holding members or sockets whereby the easel will stand in a proper display position to hold either side of the pictures or mirror in proper angular display position.

In the accompanying drawing forming a part hereof, Fig. 1 is a front elevation of a picture or mirror frame made in accordance with this invention; Fig. 2 is a sectional view on the line 2—2 of Fig. 1, looking in the direction of the arrows; Fig. 3 is a sectional view on the line 3—3 of Fig. 1, looking in the direction of the arrows; Fig. 4 is a side elevation of the hinge or pivotal connection between one of the arms of the easel and one of the channelled holding members or sockets; and Fig. 5 is a sectional view on the line 5—5 of Fig. 4, looking in the direction of the arrows.

In the drawing 1 and 2 indicate channel-shaped holding members or sockets which have closed ends 3 and which receive and hold the opposite edges of a glass 4, mirror 5 and a picture 6 disposed between the mirror and glass, as shown in Fig. 3. It will be understood that any combination of mirrors, glasses and pictures may be held between the members 1 and 2 to present a mirror at one side of the frame and a picture on the other side, or two pictures or two mirrors. The holding members or sockets 1 and 2 are as shown, arranged to fit over the opposite parallel edges of a square or rectangular glass or mirror. By making them round, oval or other shaped glasses or mirrors may be readily held by them.

To support the frame thus provided in proper display position, with either of the faces of the glasses or mirrors held thereby in angular disposition, as shown in Figs. 1 and 2, an easel 7 is provided. The same consists of a substantially U-shaped section of spring rod having a cross bar 8 from which project the integral arms 9 which normally tend to spring inwardly toward one another to a limited extent. This springing tendency of the arms causes them to clamp the glass, mirror and picture between the holders 1 and 2.

Each of the arms 9 is flattened at 10 at its end and a rivet or pivot pin 11 extends through this flattened portion and through a pressed-out boss 12 on one of the holders or sockets to pivotally secure the arm to said holder. Held in position by the rivet 11 is a stop member for limiting the pivotal movement of the easel, said member consisting of a disk 13 provided along its upper edge with a segmental projecting flange 14, the opposite ends 17 and 18 of which constitute shoulders or abutments which limit the pivoting movement of the arm. Said disk 13 is provided with a downwardly projecting tongue 15 projecting through a slot 16 to a position within the member 1 or 2 to prevent rotative movement of the disk 13.

From the foregoing, the operation of the device will be clearly understood. To insert a glass, mirror and picture between the holding members 1 and 2, said members are simply sprung apart against the spring tension of the arms 9 to permit the positioning of the glass, mirror, picture, etc. between members 1 and 2. The arms 9, springing holding members 1 and 2 toward one another for a limited distance, cause the holders to clamp the mirror, glass and picture between them. Either face of the elements 4, 5 and 6 may be disposed in angular display position by swinging the easel to the limit of its movement in the required direction with the upper end portion of the arms 9 abutting against either end or stop 17 or 18 on the flange 14. These stops hold the easel in required display position and prevent collapse of the easel with respect to the picture, mirror, etc., which is often caused when the pivotal movement of an easel with respect to a picture frame is not restricted. In use, the easel rests upon its cross bar 8 as clearly seen in Figs. 1 and 2.

What I claim is:

1. An article of the character described comprising, an easel consisting of a substantially U-shaped frame formed with a pair of spring arms movable toward one another to an extent limited only by the spring tension of the arms, channel-shaped socket members pivoted at the ends of said arms and unconnected to one another, a stop member interposed between the ends of the arms and the socket members, each of said stop members comprising a disk having a part extending through a slot in the socket member and also having a projecting flange formed with shoulders constituting abutments for limiting the pivotal movement of the arm with respect to the socket on which it is pivoted.

2. An article of the character described comprising, an easel having a pair of arms, frame members pivotally secured at the ends of said arms, stop members interposed between the arms and the frame members, said stop members consisting of plates provided with projecting segmental flanges, said flanges having ends forming shoulders constituting abutments for limiting the pivotal movement of the arms with respect to the frame members on which they are pivoted, the frame members being slotted, and tongues on the stop members extending into said slots to prevent rotative movement of the stop members.

3. An article of the character described comprising an easel having a pair of arms, frame members pivoted to said arms, a stop member for limiting the pivotal movement of each of said arms, said stop members each comprising a disk interposed between the end of the arm and the frame member, said disk having a laterally projecting flange on its upper edge, the ends of said flange forming shoulders acting as stops to limit the pivotal movement of the arm, said disk having a downwardly projecting tongue, and the frame member having a slot through which said tongue projects to prevent rotative movement of the disk with respect to the frame member.

HARRY SOLOMON.